United States Patent [19]
Ogawa et al.

[11] Patent Number: 6,094,818
[45] Date of Patent: Aug. 1, 2000

[54] PROCESS FOR PRODUCING VIBRATION ISOLATOR

[75] Inventors: Yuichi Ogawa; Rentaro Kato, both of Kasugai; Naoki Nishikawa, Oyama; Masatoshi Enomoto, Oyama; Shoichi Sato, Oyama, all of Japan

[73] Assignees: Tokai Rubber Industries, Ltd., Komaki; Showa Aluminum Corporation, Sakai, both of Japan

[21] Appl. No.: 09/241,289

[22] Filed: Feb. 1, 1999

[30] Foreign Application Priority Data

Feb. 19, 1998 [JP] Japan .................................. 10-037820

[51] Int. Cl.[7] .............................. B21F 35/00; B21D 35/00
[52] U.S. Cl. ....................... 29/896.93; 29/469.5; 72/361; 72/402; 264/262; 264/266; 264/297.5; 267/141.2
[58] Field of Search .............................. 29/896.93, 469.5; 72/354.2, 361, 402; 264/262, 266, 297.5; 267/141.2

[56] References Cited

U.S. PATENT DOCUMENTS

| | | | |
|---|---|---|---|
| 2,864,130 | 12/1958 | Beare | 264/262 |
| 3,764,100 | 10/1973 | Young et al. | 267/141.3 |
| 5,009,448 | 4/1991 | Kijima et al. | 267/293 |

*Primary Examiner*—P. W. Echols
*Attorney, Agent, or Firm*—Oblon, Spivak, McClelland, Maier & Neustadt, P.C.

[57] ABSTRACT

A process for producing a vibration isolator includes the steps of preparing an axial member, an outside member, the outside member including a cylinder-shaped portion and a bracket having a hollow, and a cylinder-shaped rubber elastic member, and drawing the cylinder-shaped portion by inserting a stationary mold, with which a drawing apparatus is provided, into the hollow of the outside member so that an outer peripheral surface of the cylinder-shaped portion contacts with the stationary mold, by disposing the rubber elastic member and the axial member inside the cylinder-shaped portion, and by pressing the cylinder-shaped portion onto the stationary mold and simultaneously diametrically reducing the cylinder-shaped portion to plastically deform the same. The production process can obviate the conventional pressed-in construction in which metallic members contact with each other, can make the manufacture of the vibration isolator easy, and can reduce the manufacturing cost.

3 Claims, 7 Drawing Sheets

PROCESS FOR PRODUCING VIBRATION ISOLATOR

BACKGROUND OF THE INVENTION

1. Field of the Invention

The present invention relates to a process for producing a vibration isolator which can be appropriately used as suspension arms, engine mounts, etc., for automobiles, for example.

2. Description of the Related Art

Figure 11:
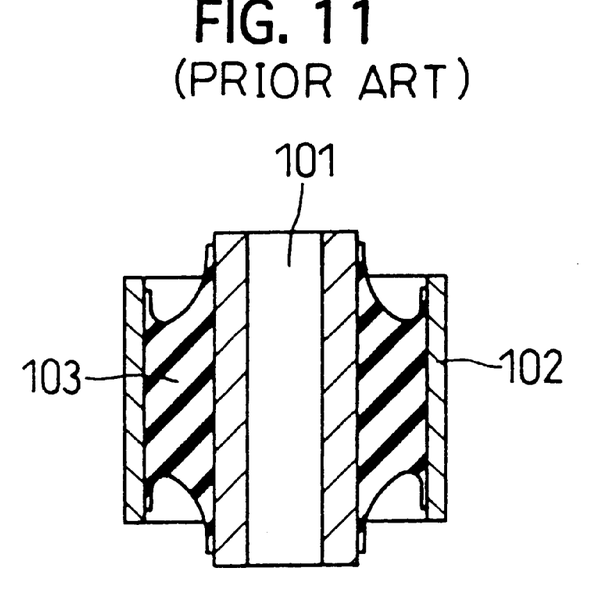
FIG. 11 is a cross-sectional view for illustrating a suspension bushing (i.e., a conventional vibration isolator)

Conventionally, a suspension bushing has been known as an insulator-and-connector device which is used at a connecting portion of a suspension arm for an automobile, for instance. As illustrated in FIG. 11, the bushing comprises a pipe-shaped inner cylindrical fitting 101, an outer cylindrical fitting 102, and a substantially-cylinder-shaped rubber elastic member 103. The outer cylindrical fitting 102 is disposed outside the inner cylindrical fitting 101 away therefrom by a predetermined distance and substantially coaxially therewith. The rubber elastic member 103 is bonded by vulcanization to an outer peripheral surface of the inner cylindrical fitting 101 and to an inner peripheral surface of the outer cylindrical fitting 102.

Figure 12:
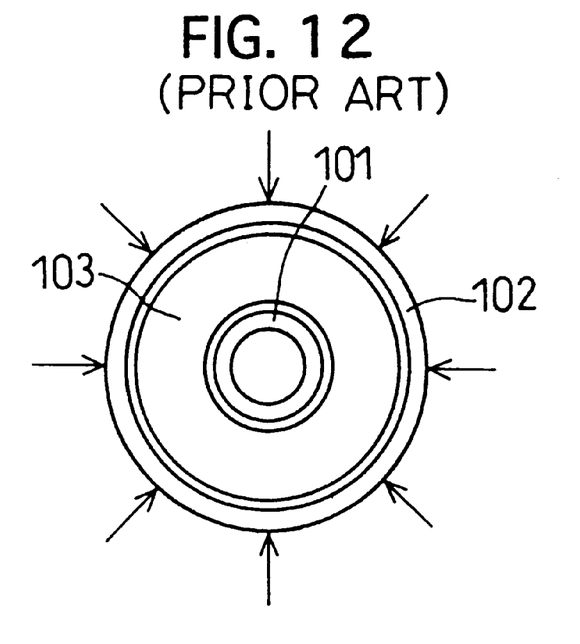
FIG. 12 is an explanatory view for illustrating how the suspension bushing (i.e., the conventional vibration isolator) is drawn.
Figure 13:
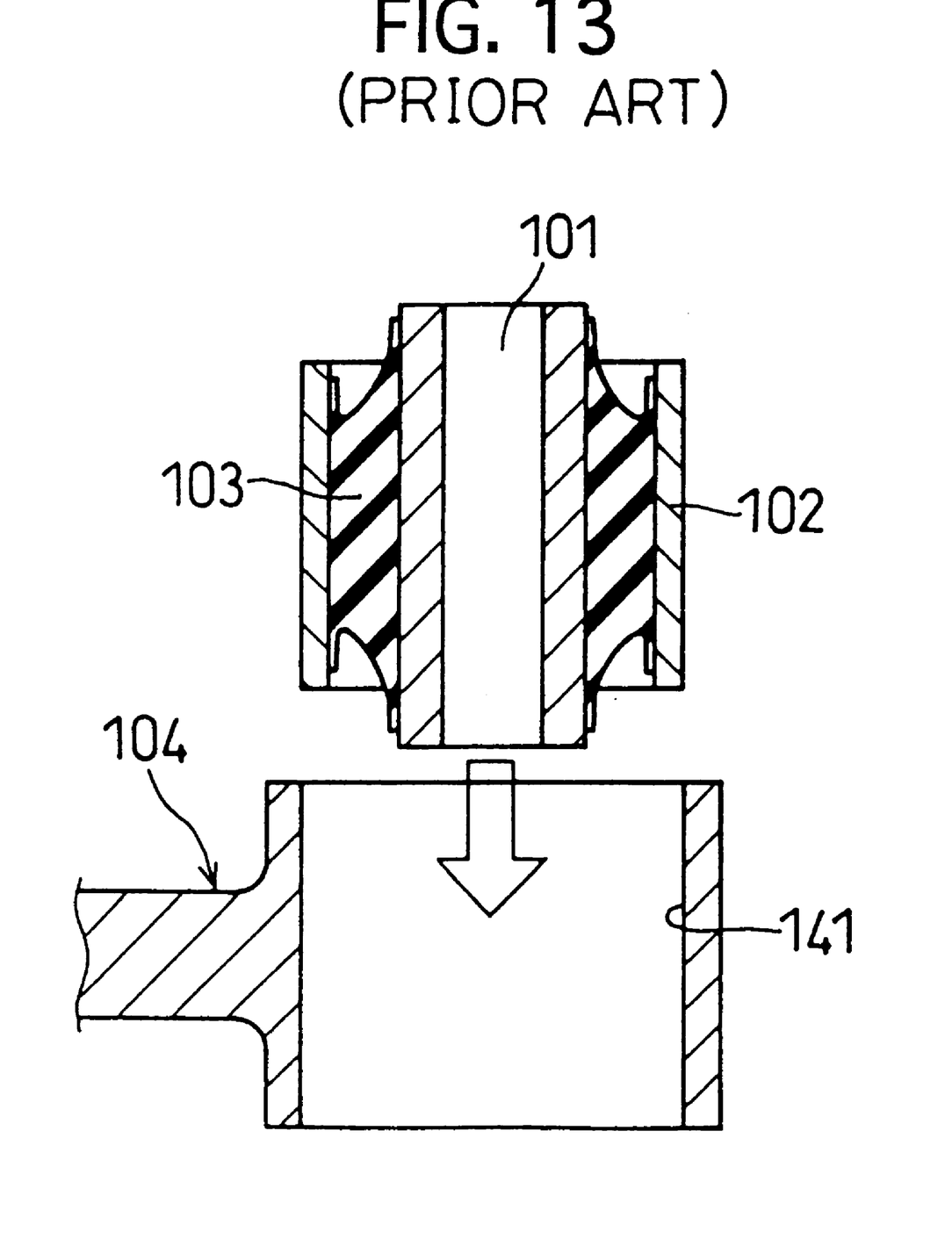
FIG. 13 is an explanatory view for illustrating how the suspension bushing (i.e., the conventional vibration isolator) is pressed into an installation hole of a suspension arm.

Taking the characteristics and durability of the rubber elastic member 103 into consideration, the bushing is subjected to a drawing process so that it is compressed and deformed inward in radial direction as illustrated in FIG. 12. Thereafter, as illustrated in FIG. 13, the bushing is fitted with and fastened to a suspension arm 104 by pressing the outer cylindrical fitting 102 into an installation hole 141 which is disposed at one end of the suspension arm 104. Then, the other installation axis, such as a connecting arm, etc., is fitted with and fastened to an inner hole of the cylindrical inner fitting 101 by fastening a bolt, or the like. Thus, the conventional bushing is put into service.

In the conventional bushing, the outside-diameter dimension of the outer cylindrical fitting 102 is required to exhibit a high accuracy because the outer cylindrical fitting 102 is fitted with and fastened to the installation hole 141 of the suspension arm 104 by pressing. However, it is difficult for the outer cylindrical fitting 102, which has been subjected to the drawing process before the pressing operation, to exhibit a satisfactory dimensional accuracy. When the outer cylindrical fitting 102 is used as it is after it has been subjected to the drawing process, it is difficult to sufficiently and stably secure the efficiency of the press-in operation and the fastening strength after the press-in operation.

For example, when the outside-diameter dimension of the outer cylindrical fitting 102 is greater than the inside-diameter dimension of the installation hole 141 entirely in peripheral direction or partially, the galling arises during the press-in operation so that it is extremely difficult to press the outer cylindrical fitting 102 into the installation hole 141. On the other hand, when the outside-diameter dimension of the outer cylindrical fitting 102 is smaller than the inside-diameter dimension of the installation hole 141 entirely in peripheral direction or partially, it is difficult to sufficiently secure the fastening strength after the press-in operation.

Hence, in order to secure the required dimensional accuracy, the outer cylindrical fitting 102 has been conventionally further subjected to a grinding process, and the like, after it is subjected to the drawing process. Since these special operations require special manufacturing processes and facilities, there arise problems in the manufacture is accordingly cumbersome and results in a sharply increased manufacturing cost.

SUMMARY OF THE INVENTION

The present invention has been developed in view of the aforementioned problems. It is therefore an object of the present invention to provide a novel process for producing a vibration isolator. More particularly, the novel process can obviate the pressed-in construction in which metallic members contact with each other, can make the manufacture easy, and can reduce the manufacturing cost.

An aspect of the present invention can carry out the object, and comprises the steps of:

preparing an axial member, an outside member and a cylinder-shaped rubber elastic member, the outside member having a cylinder-shaped portion disposed outside the axial member away therefrom by a predetermined distance and substantially coaxially therewith, the outside member further having a bracket protruding from an outer periphery of the cylinder-shaped member, the bracket having a hollow disposed at a position so as to go along an outer peripheral surface of the cylinder-shaped portion and penetrating in axial direction, and the outside member being made of an aluminum alloy, the rubber elastic member disposed between the axial member and the cylinder-shaped portion; and drawing the cylinder-shaped portion by inserting a stationary mold, with which a drawing apparatus is provided, into the hollow of the outside member so that the outer peripheral surface of the cylinder-shaped portion is disposed so as to contact with the stationary mold, by disposing the rubber elastic member and the axial member inside the cylinder-shaped portion, and by pressing the cylinder-shaped portion onto the stationary mold and simultaneously diametrically reducing the cylinder-shaped portion to plastically deform the same.

In accordance with the aspect of the present invention, in the preparing step, the axial member, the outside member and the rubber elastic member are prepared. In the subsequent drawing step, the stationary mold of the drawing apparatus is inserted into the hollow of the cylinder-shaped member of the outside member so that the outer peripheral surface of the cylinder-shaped portion is disposed so as to contact with the stationary mold. Moreover, the rubber elastic member and the axial member is disposed coaxially inside the cylinder-shaped portion. In addition, the cylinder-shaped portion is pressed onto the stationary mold, and simultaneously the entire cylinder-shaped portion is reduced diametrically to plastically deform. Accordingly, the rubber elastic member, which is disposed between the cylinder-shaped portion and the axial member, is compressed as the cylinder-shaped portion is reduced diametrically. Thus, an internal pressure is given to the rubber elastic member.

Hence, in accordance with the aspect of the present production process, it is possible to get rid of a component member which corresponds to the conventional outer cylindrical fitting, to extremely easily carry out the production of the vibration isolator, and to remarkably reduce the manufacturing cost. Further, it is unnecessary to employ the special manufacturing processes, such as the grinding process, and the like, and the facilities accompanying therewith because the press-in step of the outer cylindrical fitting which has been carried out conventionally can be abolished. This advantageous effect as well can make the manufacture extremely easy, and can reduce the manufacturing cost further sharply. Furthermore, it is possible to relieve the high dimensional accuracy required for the cylinder-shaped portion, because the cylinder-shaped portion can be completed by only carrying out the drawing process, not followed by the conventional press-in operation of the outer cylindrical fitting.

In the preparing step of the present production process, the axial member, the outside member and the rubber elastic member can be prepared independently as they are formed. Alternatively, the rubber elastic member can be pressed in or bonded to at least one of the cylinder-shaped portion of the outside member and the axial member so that they are prepared integrally with each other. When the rubber elastic member is integrated with at least one of the cylinder-shaped portion and the axial member, it is easy, in the subsequent drawing step, to position and place them when disposing them at a predetermined positions in the drawing apparatus. As for the method of bonding the rubber elastic member to the cylinder-shaped portion of the outside member and the axial member, a variety of methods can be employed, for instance, as set forth in a further aspect of the present invention described later, the rubber elastic member can be bonded by vulcanization to them. Alternatively, the rubber elastic member can be bonded to them by using an adhesive.

In the present production process, the outside member employed is made of an aluminum alloy which exhibits a superb elongation and a high strength. For example, the outside member employed can be formed by extrusion molding, vacuum die-casting molding, or the like.

In the drawing process of the present production process, the drawing apparatus is provided with the stationary mold. The stationary mold is inserted into the hollow of the outside member so that the outer peripheral surface of the cylinder-shaped portion is brought into contact with the stationary mold. Moreover, the rubber elastic member and the axial member are disposed coaxially inside the cylinder-shaped portion. In addition, the cylinder-shaped portion is reduced diametrically to plastically deform. Accordingly, an internal pressure is given to the rubber elastic member which is disposed between the cylinder-shaped portion and the axial member.

Therefore, it is necessary for the drawing apparatus used herein to be provided with the stationary mold at least. The stationary mold has a portion (or a supporting surface) which supports the outer peripheral surface of the cylinder-shaped portion when the cylinder-shaped portion is pressed to diametrically reduce after the stationary mold is inserted into the hollow of the outside member. Moreover, as for a die for pressing the cylinder-shaped portion to diametrically reduce the same, one which is appropriately employed can be, for example, a dividable-and-movable die whose die component members are arranged outside the cylinder-shaped portion and along therewith in peripheral direction, and whose die component members are disposed advanceably in centripetal direction and retractably in centrifugal direction. The stationary mold and the dividable-and-movable die can be designed properly according to the cylinder-shaped portion to be subjected to the drawing process, the entire configuration of the outside member, and the like.

In a further aspect of the present invention, the preparing step of the aforementioned aspect of the present invention includes a step of forming a rubber-molded body including: disposing the axial member and the outside member so that the cylinder-shaped portion is disposed outside the axial member substantially coaxially therewith in a mold; and forming a tubular rubber elastic member by vulcanization molding between the axial member and the cylinder-shaped member so that the rubber elastic member is bonded by vulcanization to an outer peripheral surface of the axial member and to an inner peripheral surface of the cylinder-shaped portion.

In according with the further aspect of the present invention, when the rubber elastic member is formed by vulcanization molding, the rubber elastic member can be integrated with the axial member and the cylinder-shaped portion simultaneously with the formation of the rubber elastic member. Hence, in the subsequent drawing step, the axial member, the rubber elastic member and the outside member can be positioned with ease when they are placed at their respective predetermined positions in the drawing apparatus.

For instance, when an axial member, an outside member and a rubber elastic member are bonded by vulcanization, the cylinder-shaped portion is drawn to such an extent that the rubber elastic member is compressed by a preliminary compression rate of from 3 to 10% in radial direction and the outside member is drawn within a permissible elongation range of metallic aluminum (e.g., 18% for extruded metallic aluminum).

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The preferred embodiments of the present invention will be hereinafter described with reference to the accompanying drawings.

First Preferred Embodiment

Figure 1:
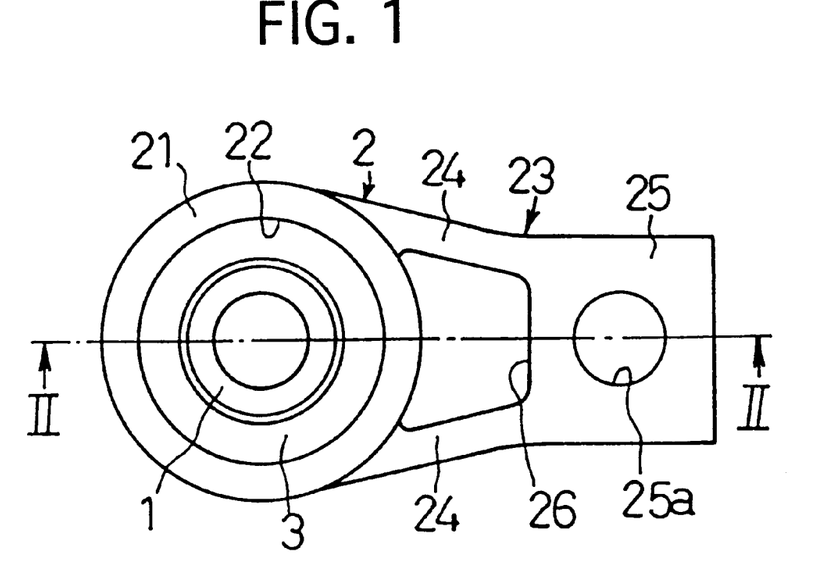
FIG. 1 is a plan view for illustrating a vibration isolator which is manufactured in accordance with a First Preferred Embodiment of the present invention.
Figure 2:
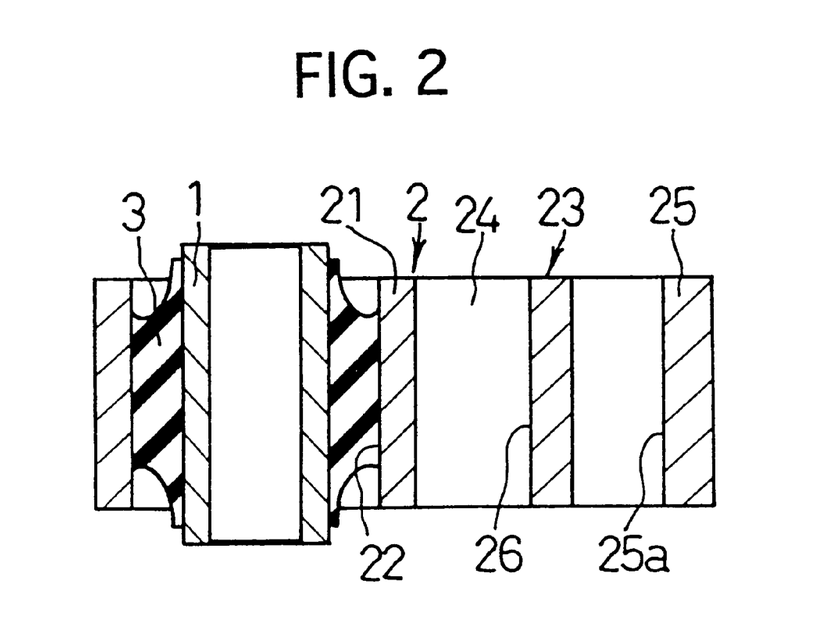
FIG. 2 is a cross-sectional view taken along the arrow II—II of FIG. 1.

The First Preferred Embodiment is a process for manufacturing a vibration isolator which composes an end of a suspension arm equipped with an automobile. As illustrated in FIGS. 1 and 2, the vibration isolator comprises a cylinder-shaped axial member 1, and outside member 2, and a substantially-cylinder-shaped rubber elastic member 3. The outside member 2 is made of an aluminum alloy, and includes a cylinder-shaped portion 21 and a bracket 23. The cylinder-shaped portion 21 is disposed outside the axial member 1 away therefrom by a predetermined distance and coaxially therewith, and has an installation hole 22 which is formed therein and penetrates therethrough in axial direction. The bracket 23 protrudes from an outer periphery of the cylinder-shaped portion 21, and has a mounting hole 25a and a hollow 26 which are formed therein. The rubber elastic member 3 is bonded by vulcanization to an outer peripheral surface of the axial member 1 and to an inner peripheral surface of the cylinder-shaped portion 21, and is compressed by the axial member 1 and the cylinder-shaped portion 21 so that an internal pressure is given thereto.

The vibration isolator is manufactured by carrying out a preparatory step and a drawing step. The preparatory step includes a rubber-molded body forming step as hereinafter described.

First, at the preparatory step, the axial member 1 and the outside member 2 are prepared. The axial member 1 is made of an aluminum alloy so that it is formed as a cylinder shape of a predetermined size. As illustrated in FIG. 1, the outside member 2 includes the cylinder-shaped portion 21 and the bracket 23. As illustrated in FIG. 2, the cylinder-shaped member 21 has the installation hole 22 which is formed therein and penetrates therethrough in axial direction. As illustrated in FIG. 1, the bracket 23 includes a pair of legs 24, 24 and a squared-block-shaped connector 25. The legs 24, 24 protrude from an outer periphery of the cylinder-shaped portion 21 in the substantially same direction. The connector 25 is connected with the protruding leading ends of the legs 24, 24 and has the mounting hold 25a formed therein.

Between the pair of legs 24, 24, there is formed the hollow 26 which is formed together with the outer peripheral surface of the cylinder-shaped portion 21 and the outer peripheral surface of the connector 25. The hollow 26 is formed parallelly to the installation hole 22 and the mounting hole 25a in axial direction. The outside member 2 is made of an aluminum alloy by extrusion molding.

In the subsequent rubber-molded body forming step, a mold is prepared for molding, mold which is adapted to mold the rubber elastic member 3 by vulcanization molding. In the mold, the axial member 1 and the outside member 2 are disposed so that the cylinder-shaped portion 21 is disposed outside the axial member 1 substantially coaxially therewith. Under the circumstances, a rubber molding material is injected into a cavity which is formed between the axial member 1 and the cylinder-shaped portion 21, thereby carrying out a vulcanization molding process. Thus, the cylinder-shaped rubber elastic member 3 is formed between the axial member 1 and the cylinder-shaped portion 21. Accordingly, a rubber-molded body is formed. In the rubber-molded body, the rubber elastic member 3 is bonded by vulcanization to the outer peripheral surface of the axial member 1 and the inner peripheral surface of the cylinder-shaped portion 21 so that it is formed integrally with the axial member 1 and the cylinder-shaped portion 21.

Figure 3:
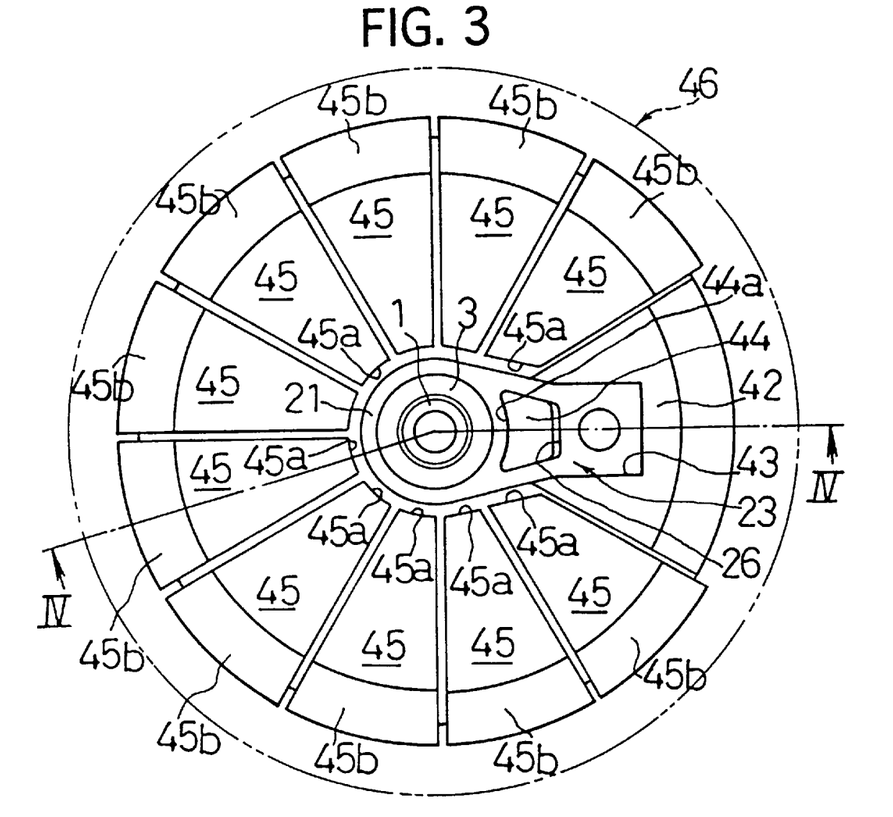
FIG. 3 is a plan view for illustrating how an intermediate product is placed in a drawing apparatus which is used in the First Preferred Embodiment of the present invention.
Figure 4:
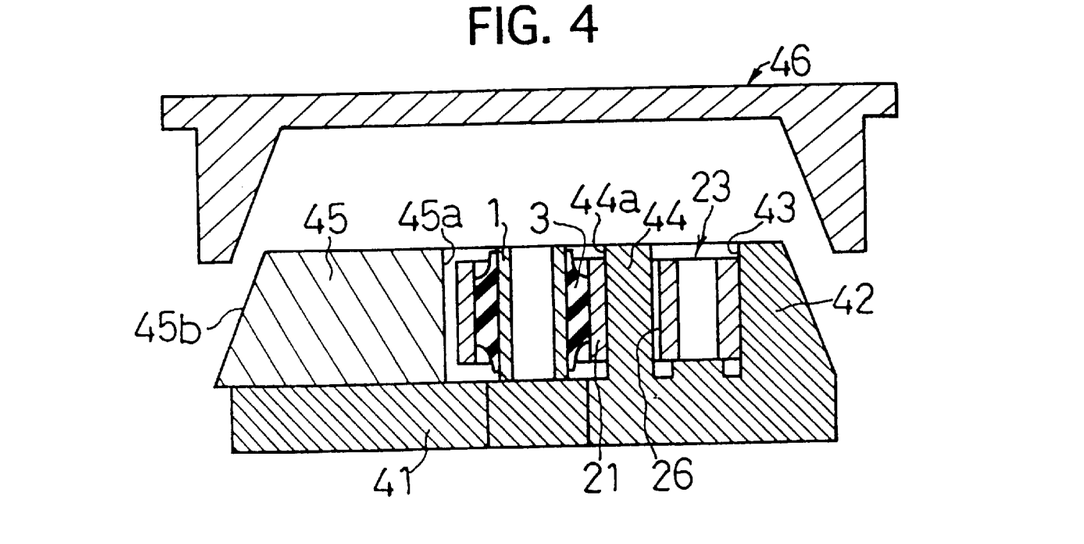
FIG. 4 is a cross-sectional view for illustrating portions of the intermediate product and the drawing apparatus, portions which are taken in the direction of the arrow IV—IV of FIG. 3.

Then, in the following drawing step, the rubber-molded body obtained at the preceding step is subjected to drawing by using a drawing apparatus as illustrated in FIGS. 3 and 4. The drawing apparatus used herein includes a base disk 41, a stationary die 42, a separable-and-movable die 45, and a driving unit 46. As illustrated in FIG. 4, the stationary die 42 is disposed on the base disk 41 integrally therewith, and is placed at a position in peripheral direction on the base disk 41. As illustrated in FIG. 3, the separable-and-movable die 45 is formed so that it is divided into 10 die component members in peripheral direction, and is disposed on the base disk 41 in peripheral direction excepting the portion of the base disk 41 where the stationary die 42 is disposed. The separable-and-movable die 45 is made advaceable in centripetal direction, and is thereafter made retractable in centrifugal direction. The driving unit 46 drives the 10 die component members of the separable-and-movable die 45 to synchronously advance in centripetal direction and thereafter to synchronously retract in centrifugal direction.

In the stationary die 42, there are disposed a fitting hole 43 into which the bracket 23 of the outside member 2 is inserted, and a pillar-shaped core die 44 which is inserted into the hollow 26. In the inner side surface of the core die 44, there is formed an arc-shaped supporting surface 44a which supports a part of the outer peripheral surface of the cylinder-shaped portion 21 when the cylinder-shaped portion is reduced diametrically.

Moreover, on the side surface of the 8 die component members of the separable-and-movable die 45 excepting the die component members thereof neighboring the opposite sides of the stationary die 42, there is formed an arc-shaped acting surface 45a which corresponds to the outer peripheral configuration of the cylinder-shaped portion 21 after drawing. Along with the supporting surface 44a of the core die 44, the arc-shaped acting surfaces 45a are positioned on an identical circumference. On the side surface of the die component members of the separable-and-moving die 45 neighboring the opposite sides of the stationary die 42, there is formed a flat acting surface 45a which corresponds to the outer side surface configuration of the legs 24, 24 after drawing. These die component members of the separable-and-movable die 45 are usually put into a standby position where they are retracted in centrifugal direction. When the driving unit 46 descends to press the outer inclined surfaces 45b of the die component members of the separable-and-movable die 45, the die component members advance synchronously in centripetal direction.

When carrying out a drawing operation by the drawing apparatus, as illustrated in FIGS. 3 and 4, the bracket 23 is fitted with the fitting hole 43 of the stationary die 42 while the core die 44 of the stationary die 42 is inserted into the hollow 26. Accordingly, the cylinder-shaped member 21 is placed so that it is positioned inside the die component members of the separable-and-movable die 45. Consequently, the cylinder-shaped portion 21 is placed so that a part of the outer peripheral surface of the cylinder-shaped portion 21 is brought into contact with supporting surface 44a of the stationary die 42. Under the circumstances, the die component members of the separable-and-movable die 45 are advanced by descending the driving unit 46.

Figure 5:
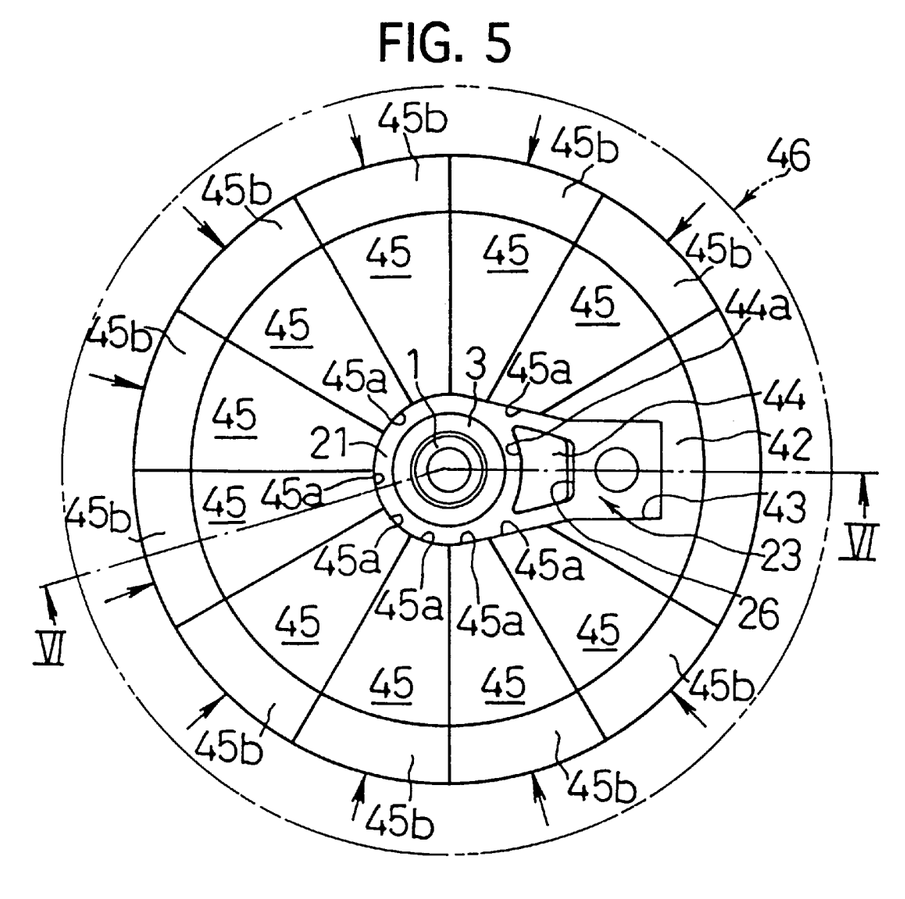
FIG. 5 is a plan view for illustrating how the intermediate product is drawn by the drawing apparatus in the First Preferred Embodiment of the present invention.
Figure 6:
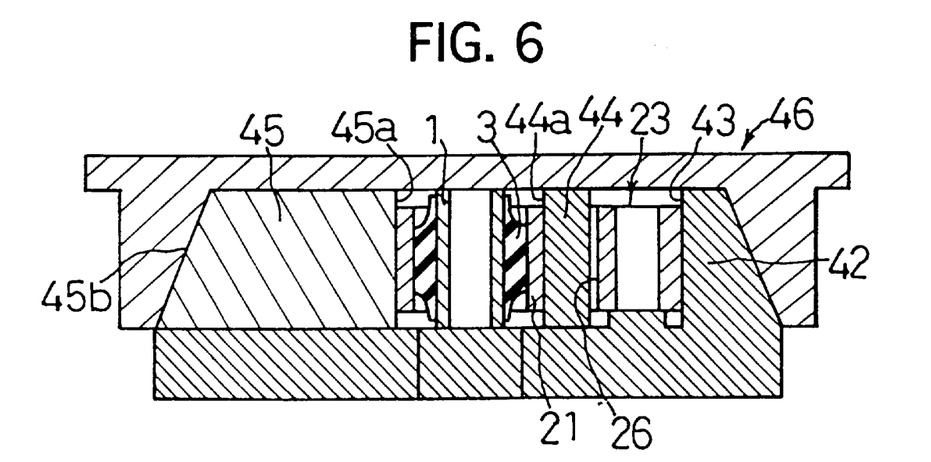
FIG. 6 is a cross-sectional view for illustrating portions of the intermediate product and the drawing apparatus, portions which are taken in the direction of the arrow VI—VI of FIG. 5.

Thus, as illustrated in FIGS. 5 and 6, the die component members of the separable-and-movable die 45 advance while they press the cylinder-shaped portion 21 toward the core die 44 of the stationary die 42. Accordingly, the cylinder-shaped portion 21 is reduced diametrically by the acting surfaces 45*a* of the die component members of the separable-and-movable die 45 and by the supporting surface 44*a* of the core die 44, and is thus deformed plastically. Note that, at this moment, the die component members of the separable-and-movable die 45 neighboring the opposite sides of the stationary die 42 press the outer side surfaces of the legs 24, 24. Consequently, as the cylinder-shaped portion 21 is drawn (or reduced diametrically), the legs 24, 24 are deformed so that they approach each other on the side of the cylinder-shaped portion 21. Thus, the rubber elastic member 3, which is disposed between the cylinder-shaped portion 21 and the axial member 1, is compressed by the cylinder-shaped portion 21 and the axial member 1, and is subjected to an internal pressure.

After carrying out the drawing operation to the cylinder-shaped portion 21 of the outside member 2 as described above, the intermediate product is taken out of the drawing apparatus. Then, the intermediate product is subjected to an after treatment to complete the vibration isolator illustrated in FIGS. 1 and 2.

As described so far, the First Preferred Embodiment of the present vibration-isolator production process is carried out in the following manner; namely, at the preparatory step, the rubber-molded body is formed so that the rubber elastic member 3 is directly bonded to an outer peripheral surface of the axial member 1 and to an inner peripheral surface of the cylinder-shaped portion 21; and thereafter, at the drawing step, the cylinder-shaped portion 21 is pressed by the die component members of the separable-and-movable die 45 toward the core die 44 of the stationary die 42 entirely, and simultaneously the cylinder-shaped portion 21 is reduced diametrically to plastically deform. Thus, an internal pressure is given to the rubber elastic member 3, which is disposed between the cylinder-shaped portion 21 and the axial member 1.

Hence, in accordance with the First Preferred Embodiment of the present vibration-isolator production process, it is possible to get rid of a component member which corresponds to the conventional outer cylindrical fitting, to extremely easily carry out the production of the vibration isolator, and to remarkably reduce the manufacturing cost. Further, it is unnecessary to employ the special manufacturing processes, such as the grinding process, and the like, and the facilities accompanying therewith because the press-in step of the outer cylindrical fitting which has been carried out conventionally can be abolished. This advantageous effect as well can make the manufacture extremely easy, and can reduce the manufacturing cost further sharply. Furthermore, it is possible to relieve the high dimensional accuracy required for the cylinder-shaped portion, because the cylinder-shaped portion 21 can be completed by only carrying out the drawing process, not followed by the conventional press-in operation of the outer cylindrical fitting.

Moreover, the preparatory step of the First Preferred Embodiment of the present vibration-isolator production process is carried out in the following manner: namely, when the rubber elastic member 3 is formed by vulcanization molding, it is formed integrally with the axial member 1 and the outside member 2; and, simultaneously with the formation of the rubber elastic member 3, the rubber elastic member 3 is integrated with the axial member 1 and the cylinder-shaped portion 21. Hence, at the subsequent drawing step, it is possible to easily position and place the axial member 1, the outside member 2 and the rubber elastic member 3 when they are arranged at their predetermined positions in the drawing apparatus.

In addition, at the drawing step of the First Preferred Embodiment, the hollow 26 which is disposed in the bracket 23 of the outside member 2 is utilized so that the cylinder-shaped portion 21 is reduced diametrically while it is pressed entirely against the supporting surfaces 44*a* of the core die 44 which is inserted into the hollow 26, and is thus deformed plastically. As a result, it is possible to carry out the drawing operation so that the roundness, the dimensional accuracy, etc., of the cylinder-shaped portion are achieved satisfactorily.

Second Preferred Embodiment

Figure 7:
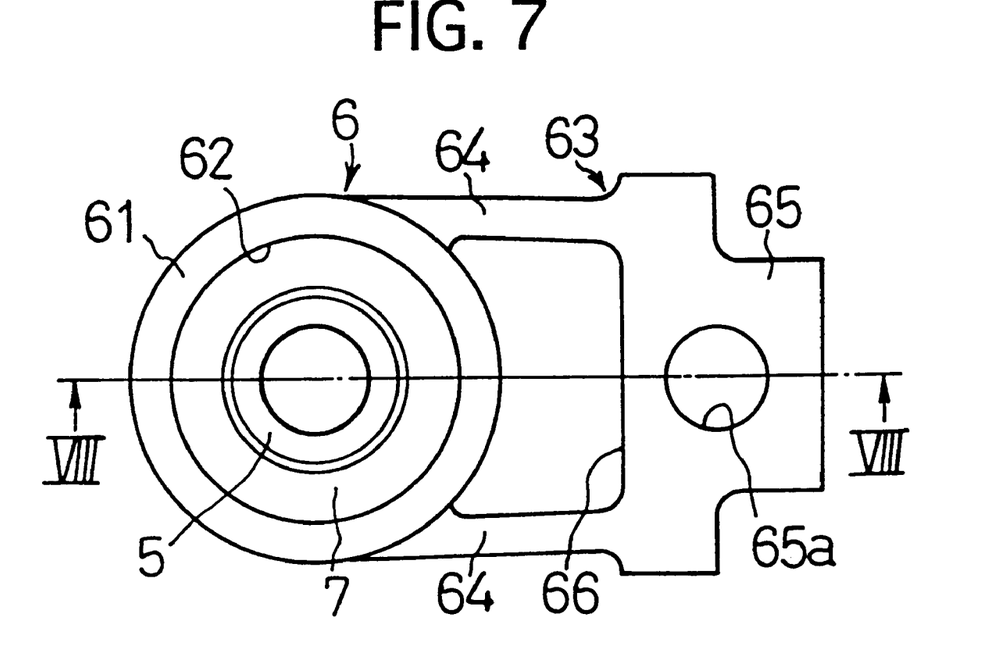
FIG. 7 is a plan view for illustrating a vibration isolator which is manufactured in accordance with a Second Preferred Embodiment of the present invention.
Figure 8:
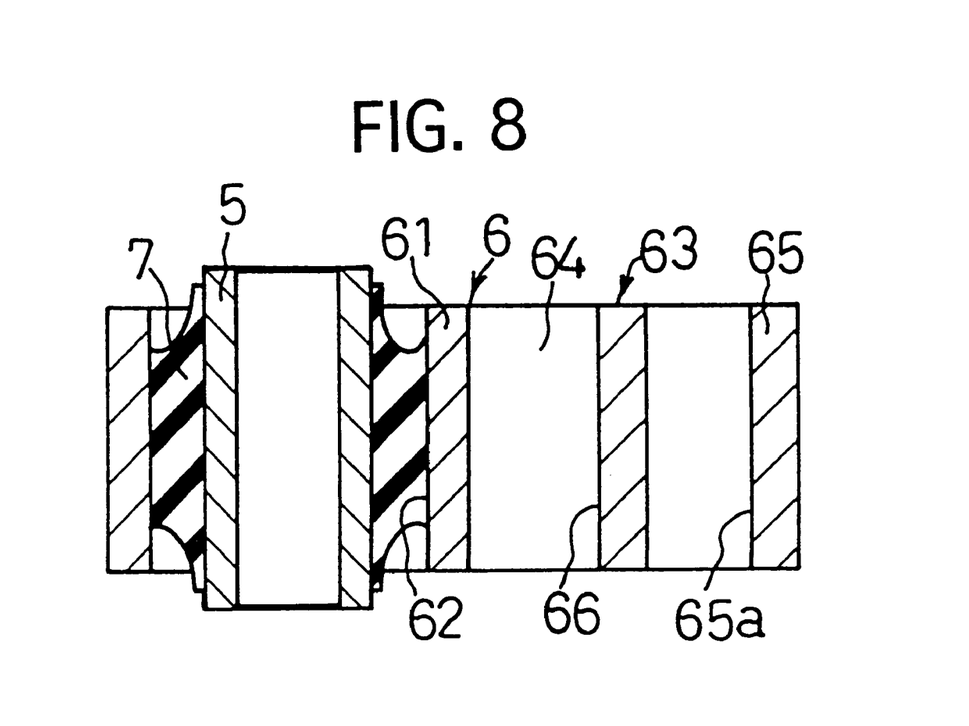
FIG. 8 is a cross-sectional view taken along the arrow VIII—VIII of FIG. 7.

Similarly to the aforementioned First Preferred Embodiment, the Second Preferred Embodiment is a process for manufacturing a suspension bushing which constitutes an end portion of a suspension arm equipped with an automobile. As illustrated in FIGS. 7 and 8, the vibration isolator comprises a cylinder-shaped axial member 5, an outside member 6 made of an aluminum alloy, and a substantially-cylinder-shaped rubber elastic member 7. The outside member 6 includes a cylinder-shaped portion 61 and a bracket 63. The cylinder-shaped portion 61 is disposed outside the axial member 5 away therefrom by a predetermined distance and coaxially therewith, and has an installation hole 62 which is formed therein and penetrates therethrough in axial direction. The bracket 63 protrudes from an outer periphery of the cylinder-shaped portion 61, and has a mounting hole 65*a* and a hollow 66 which are formed therein. The rubber elastic member 7 is bonded by vulcanization to an outer peripheral surface of the axial member 5 and to an inner peripheral surface of the cylinder-shaped portion 61, and is compressed by the axial member 5 and the cylinder-shaped portion 61 so that an internal pressure is given thereto.

Note that this vibration isolator differs from that of the above-described First Preferred Embodiment in that the bracket 63 of the outside member 6 has a pair of legs 64, 64 and a squared-block-shaped connector 65. The pair of legs 64, 64 protrude from an outer periphery of the cylinder-shaped in the same direction parallelly. The connector 65 is connected with the protruding leading ends of the legs 64, 64, and has the mounting hole 65*a* which is formed therein. Namely, the interval between the pair of legs 64, 64 is widened so that the hollow 66 formed therebetween is prolonged in peripheral direction. With this arrangement, the peripheral length of the outer peripheral surface of the cylinder-shaped portion 61 is secured sufficiently over the peripheral portion where the cylinder-shaped portion 61 faces the hollow 66.

Similarly to the aforementioned First Preferred Embodiment, the vibration isolator is manufactured by carrying out a preparatory step and a drawing step. The preparatory step includes a rubber-molded body forming step.

First, at the preparatory step, the axial member 5 and the outside member 6 are prepared. Then, at the subsequent rubber-molded body forming step, a mold is prepared for molding in the same fashion as the above-described First Preferred Embodiment, mold which is adapted to mold the rubber elastic member 7 by vulcanization molding. In the mold, the axial member 5 and the outside member 6 are disposed so that the cylinder-shaped portion 61 is disposed outside the axial member 5 substantially coaxially therewith. Under the circumstances, a rubber molding material is injected into a cavity in the mold, thereby carrying out a vulcanization molding process. According, a rubber-molded body is formed. In the rubber-molded body, the rubber elastic member 7 is bonded to the outer peripheral surface of the axial member 5 and the inner peripheral surface of the cylinder-shaped portion 61 so that it is formed integrally with the axial member 5 and the cylinder-shaped portion 61.

Then, at the following drawing step, the rubber-molded body obtained at the preceding step is subjected to drawing by using a drawing apparatus which is similar to the one used in the above-described First Preferred Embodiment. Note that the drawing apparatus used herein is changed in terms of the design. Specifically, in order to cope with the bracket 63 of the outside member 6 which is structured differently from that of the aforementioned First Preferred Embodiment, the following are changed in terms of the design: namely, a fitting hole 83 of a stationary die 82; a core die 84; and two die component members of a separable-and-movable die 85 which are disposed on the opposite sides of the stationary die 82. In particular, since the peripheral length of the outer peripheral surface of the cylinder-shaped portion 61 is prolonged over the peripheral portion where the cylinder-shaped portion 61 faces the hollow 66, the peripheral length of the supporting surface 84a of the core die 84 is designed so that it is a securely sufficient length in order to cope with the arrangement.

Figure 9:
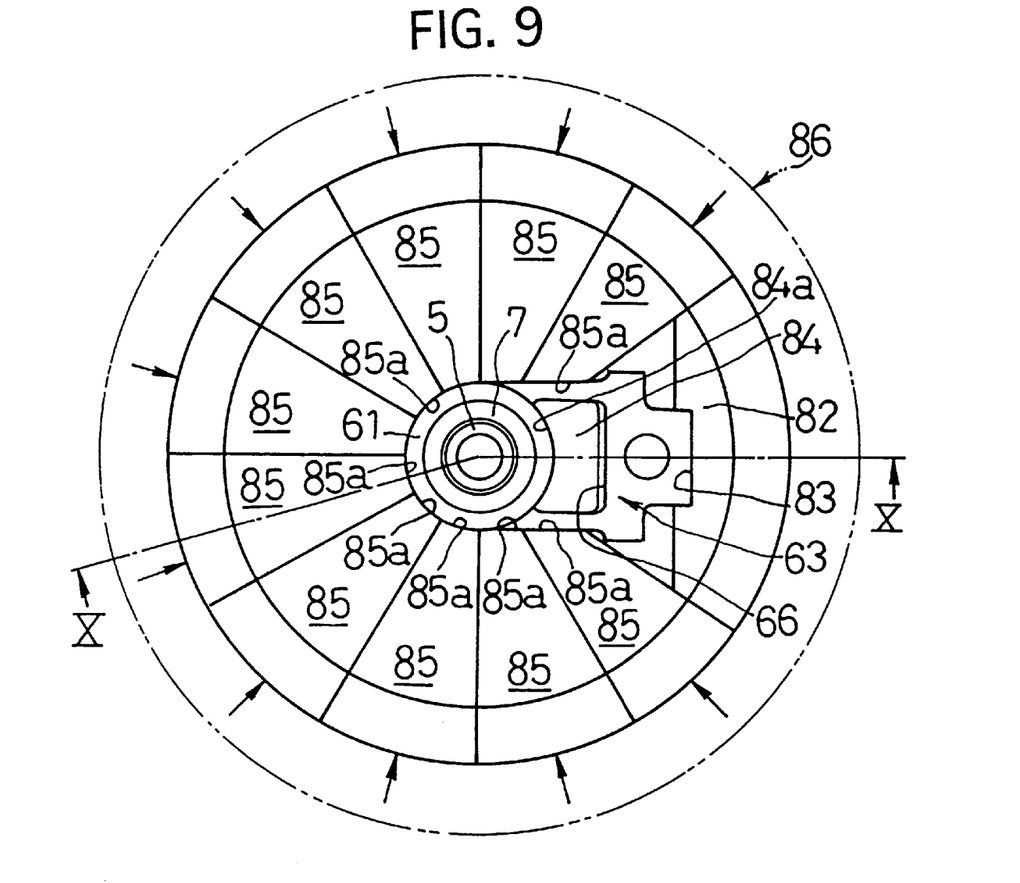
FIG. 9 is a plan view for illustrating how an intermediate product is drawn in a drawing apparatus which is used in the Second Preferred Embodiment of the present invention.
Figure 10:
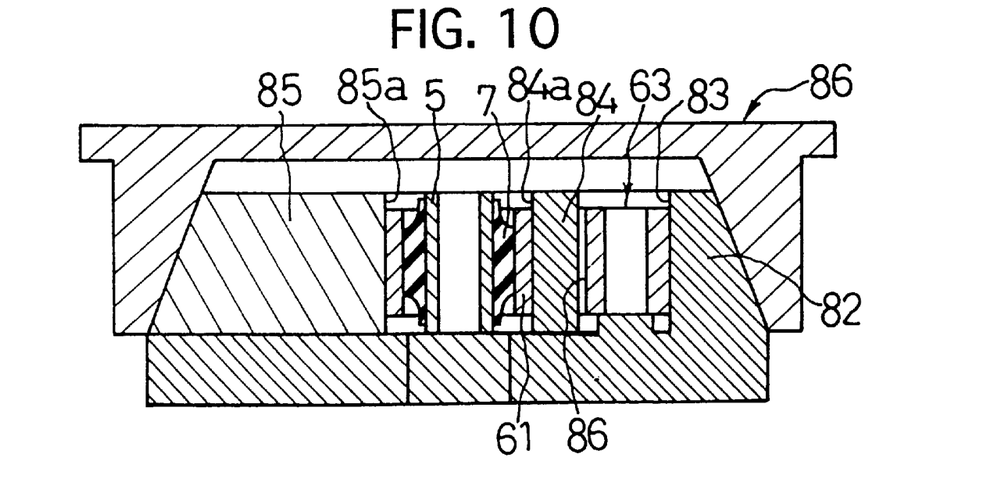
FIG. 10 is a cross-sectional view for illustrating portions of the intermediate product and the drawing apparatus, portions which are taken in the direction of the arrow X—X of FIG. 9.

When carrying out a drawing operation by the drawing apparatus, the bracket 63 is fitted with the fitting hole 83 of the stationary die 82 while the core die 84 of the stationary die 82 is inserted into the hollow 86. Accordingly, the cylinder-shaped member 61 is placed so that it is positioned inside the die component members of the separable-and-movable die 85. Consequently, the cylinder-shaped portion 61 is placed so that a part of the outer peripheral surface of the cylinder-shaped portion 61 is brought into contact with the supporting surface 84a of the stationary die 82. Under the circumstances, the die component members of the separable-and-movable die 85 are advanced by descending a driving unit 86. Thus, as illustrated in FIGS. 9 and 10, the die component members of the separable-and-movable die 85 advance while they press the cylinder-shaped portion 61 toward the core die 84 of the stationary die 82. Accordingly, the cylinder-shaped portion 61 is reduced diametrically by the acting surfaces 85a of the die component members of the separable-and-movable die 85 and by the supporting surface 84a of the core die 84, and is thus deformed plastically. Note that, at this moment, the two die component members of the separable-and-movable die 85 neighboring the opposite sides of the stationary die 82 press the outer side surfaces of the legs 64, 64. Consequently, as the cylinder-shaped portion 61 is drawn (or reduced diametrically), the legs 64, 64 are deformed so that they approach each other on the side of the cylinder-shaped portion 61. Thus, the rubber elastic member 7, which is disposed between the cylinder-shaped portion 61 and the axial member 5, is compressed by the cylinder-shaped portion 61 and the axial member 5, and is subjected to an internal pressure.

After carrying out the drawing operation to the outside member 6 as described above, the intermediate product is taken out of the drawing apparatus Then, the intermediate product is subjected to an after treatment to complete the vibration isolator illustrated in FIGS. 7 and 8.

As described so far, the Second Preferred Embodiment of the present vibration-isolator production process is carried out in the following manner: namely, at the preparatory step, the rubber-molded body is formed so that the rubber elastic member 7 is directly bonded to an outer peripheral surface of the axial member 5 and to an inner peripheral surface of the cylinder-shaped portion 61; and thereafter, at the drawing step, the cylinder-shaped portion 61 is pressed by the die component members of the separable-and-movable die 85 toward the core die 84 of the stationary die 82, and simultaneously the entire cylinder-shaped portion 61 is reduced diametrically to plastically deform. Thus, an internal pressure is given to the rubber elastic member 7, which is disposed between the cylinder-shaped portion 61 and the axial member 5.

Hence, in accordance with the Second Preferred Embodiment of the present vibration-isolator production process, it is possible to get rid of a component member which corresponds to the conventional outer cylindrical fitting, to extremely easily carry out the production of the vibration isolator, and to remarkably reduce the manufacturing cost. In addition, it is needless to say that the Second Preferred Embodiment can operate and produce the other advantages in the same manner as the aforementioned First Preferred Embodiment.

Note that, in the Second Preferred Embodiment, the hollow 66 which is formed in the bracket 63 of the outside member 6 is formed so as to have a prolonged length in the peripheral direction. Also note that the peripheral length of the outer peripheral surface of the cylinder-shaped portion 61 is prolonged over the peripheral portion where the cylinder-shaped portion 61 faces the hollow 66. Consequently, when the core die 84 of the stationary die 82 is inserted into the hollow 66 of the bracket 63, and when the cylinder-shaped portion 61 is subjected to the drawing, it is possible to prolong the supporting surface 84a of the core die 84 of the stationary die 82 which supports the outer peripheral surface of the cylinder-shaped portion 61. With this arrangement, it is possible to more securely carry out the drawing of the cylinder-shaped portion 61. Moreover, it is possible to further upgrade the roundness, the dimensional accuracy, etc., of the cylinder-shaped portion 61 after the drawing.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a vibration isolator, comprising the steps of:

preparing an axial member, an outside member and a cylinder-shaped rubber elastic member, the outside member having a cylinder-shaped portion disposed outside the axial member away therefrom by a predetermined distance and substantially coaxially therewith, the outside member further having a bracket protruding from an outer periphery of the cylinder-shaped member, the bracket having a hollow disposed at a position so as to extend along an outer peripheral surface of the cylinder-shaped portion and extending in the axial direction of the cylinder-shaped portion, and the outside member being made of an aluminum alloy, the rubber elastic member disposed between the axial member and the cylinder-shaped portion; and drawing the cylinder-shaped portion by inserting a stationary mold, with which a drawing apparatus is provided, into the hollow of the outside member so that the outer peripheral surface of the cylinder-shaped portion is disposed so as to contact with the stationary mold, by disposing the rubber elastic member and the axial member inside the cylinder-shaped portion, and by pressing the cylinder-shaped portion onto the stationary mold and simultaneously diametrically reducing the cylinder-shaped portion to plastically deform the same.

2. The process according to claim 1, wherein said preparing step includes a step of forming a rubber-molded body including: disposing the axial member and the outside member so that the cylinder-shaped portion is disposed outside the axial member substantially coaxially therewith in a mold; and forming a tubular rubber elastic member by vulcanization molding between the axial member and the cylinder-shaped member so that the rubber elastic member is bonded by vulcanization to an outer peripheral surface of the axial member and to an inner peripheral surface of the cylinder-shaped portion.

3. The process according to claim 1 wherein the drawing apparatus is further provided with a dividable-and-movable die whose die component members are arranged outside the cylinder-shaped portion and along therewith in peripheral direction, and whose die component members are disposed advanceably in centripetal direction and retractably in centrifugal direction.

* * * * *